US007430536B1

(12) United States Patent
Borten

(10) Patent No.: US 7,430,536 B1
(45) Date of Patent: Sep. 30, 2008

(54) SYSTEM AND METHOD FOR ASSISTING A BANK IN MEETING REQUIREMENTS UNDER THE COMMUNITY REINVESTMENT ACT

(75) Inventor: Daniel A. Borten, 131 Selby St., Gaithersburg, MD (US) 20878

(73) Assignee: Daniel A. Borten, Gaithersburg, MD (US)

( * ) Notice: Subject to any disclaimer, the term of this patent is extended or adjusted under 35 U.S.C. 154(b) by 116 days.

(21) Appl. No.: 11/216,822

(22) Filed: Aug. 31, 2005

Related U.S. Application Data

(63) Continuation-in-part of application No. 10/816,066, filed on Apr. 1, 2004, now abandoned.

(51) Int. Cl.
*G06Q 40/00* (2006.01)
(52) U.S. Cl. .......................................... 705/38; 705/35
(58) Field of Classification Search .................. 705/38, 705/2, 4, 19, 30–31, 35–39; 707/104.1
See application file for complete search history.

(56) References Cited

U.S. PATENT DOCUMENTS

| 6,073,104 | A | * | 6/2000 | Field ............................ 705/1 |
| 6,920,434 | B1 | | 7/2005 | Cossette |
| 2003/0144937 | A1 | | 7/2003 | Garella et al. |
| 2004/0167807 | A1 | | 8/2004 | Fitzsimmons et al. |
| 2004/0254878 | A1 | | 12/2004 | Fitzsimmons et al. |

OTHER PUBLICATIONS

"Study: Insurance CRA a success" in the Bay State Banner, Dec. 7, 2000, by Yawu Miller 3 pages attached.*
Mylsma, Michael S., "Interpretive Letter #1008, Oct. 2004, 12 USC 2901," Jul. 19, 2004, Comptroller of the Currency, Administrator of National Banks, Washington, DC, 20219.

* cited by examiner

*Primary Examiner*—Mary Cheung
*Assistant Examiner*—Kirsten S Apple
(74) *Attorney, Agent, or Firm*—Morgan, Lewis & Bockius LLP

(57) ABSTRACT

Systems and methods for assisting a bank in meeting all or a portion of the bank's requirements under the Community Reinvestment Act (CRA) on a tax-advantaged basis. New or existing cash value life insurance policies on the lives of employees of the bank or an affiliate of the bank are provided. The cash-value life insurance policies designate the bank, the affiliate or a trust as owner and beneficiary. The assets which support the cash value of the life insurance policies are maintained in a separate account that is protected from general creditors of an issuer of the life insurance policies. The assets in the separate account are used to purchase (i) bank-eligible securities that are qualified investments, which promote community development, as defined under the CRA or (ii) whole loans that are CRA qualified loans, or community development loans, as defined under the CRA. The assets in the account grow on a tax-advantaged basis, and specific qualified investments or loans in the separate account are attributed to the bank to satisfy the requirements of the bank under the CRA.

9 Claims, 4 Drawing Sheets

SYSTEM AND METHOD FOR ASSISTING A BANK IN MEETING REQUIREMENTS UNDER THE COMMUNITY REINVESTMENT ACT

CROSS-REFERENCE TO RELATED APPLICATION

The present application is a continuation-in-part of U.S. patent application Ser. No. 10/816,066, filed Apr. 1, 2004 now abandoned.

FIELD OF THE INVENTION

The present invention relates to systems and methods used by banks for meeting the requirements articulated under the Community Reinvestment Act.

BACKGROUND

The Community Reinvestment Act (CRA) is intended to encourage depository institutions to help meet the credit needs of the communities in which they operate, including low- and moderate-income (LMI) borrowers and neighborhoods, consistent with safe and sound banking operations. The CRA was enacted by Congress in 1977 (12 U.S.C. 2901) and is implemented by Regulations 12 CFR parts 25, 228, 345, and 563e. The Regulation was revised in May 1995.

The CRA requires that each insured depository institution's record of helping to meet the credit needs of its entire community be evaluated periodically. That record is taken into account in considering an institution's application for deposit facilities (i.e., new branches), including mergers and acquisitions. CRA examinations are conducted by the federal agencies that are responsible for supervising depository institutions: the Board of Governors of the Federal Reserve System (FRB), the Federal Deposit Insurance Corporation (FDIC), the Office of the Comptroller of the Currency (OCC), and the Office of Thrift Supervision (OTS). These agencies comprise the Federal Financial Institutions Examination Council or FFIEC.

The four federal agencies approved examination procedures to implement the revised Community Reinvestment Act (CRA) regulations that were published in the Federal Register on May 4, 1995. There are four sets of procedures—procedures for small institutions, for large retail institutions, for wholesale and limited purpose institutions, and for institutions that have been approved for evaluation under a strategic plan. Recently, the agencies created a new category—Intermediate Small—for institutions between $250 mm and $1 Bil in assets. The four different procedures correspond to the four alternative evaluation methods provided in the revised CRA regulations and are designed to respond to basic differences in institutions' structures and operations.

In summary, the CRA regulations measure how successfully an institution meets the community development and credit needs of its assessment area (geographic operating "footprint") through lending, investments, and service. For large retail institutions, the test weightings are 50%, 25%, and 25%, respectively. Effective Sep. 1, 2005 intermediate small banks will be measured on lending and a flexible community development test; whereby the bank can establish its own mix of community development lending, investment, and service.

The federal agencies have provided answers to numerous inquiries from financial institutions, investment managers, and other parties interested in community development, pertaining to the provisions and topics of the CRA regulations. The OCC, on behalf of the other FFIEC members, published a series of Interpretive Letters soon after the release of the revised regulations in 1995. An official Interagency Q&A Regarding Community Reinvestments notice was published in the Federal Register on Jul. 12, 2001 and the number of Interpretive Letters on the CRA has since slowed dramatically.

The CRA regulations define community development, qualified investments and other terms to guide regulated institutions in their compliance. Some of the key definitions in the regulations include:

"Qualified Investment" means a lawful investment, deposit, membership share, or grant that has as its primary purpose community development.

"Community development" means: (1) affordable housing (including multifamily rental housing) for low- or moderate-income individuals (LMI); (2) community services targeted to low- or moderate-income individuals; (3) activities that promote economic development by financing businesses or farms that meet the size eligibility standards of the Small Business Administration's Development Company or Small Business Investment Company programs (13 CFR 121.301) or have gross annual revenues of $1 million or less; or (4) activities that revitalize or stabilize low- or moderate-income geographies.

"Community development loan" means a loan that: (1) has as its primary purpose community development; and (2) except in the case of a wholesale or limited purpose bank: (i) has not been reported or collected by the bank or an affiliate for consideration in the bank's assessment as a home mortgage, small business, small farm, or consumer loan, unless it is a multifamily dwelling loan and (ii) benefits the bank's assessment area(s) or a broader statewide or regional area that includes the bank's assessment area(s).

"Income level" includes: "Low-income", which means an individual income that is less than 50 percent of the area median income, or a median family income that is less than 50 percent, in the case of geography; "Moderate-income", which means an individual income that is at least 50 percent and less than 80 percent of the area median income, or a median family income that is at least 50 and less than 80 percent, in the case of a geography. (Thus low-to-moderate income (LMI) includes individuals whose income is less than 80 percent of area median income, or median family income that is less than 80 percent, in the case of a geography.)

"Area Median Income" means the median family income for the MSA (Metropolitan Statistical Area), if a person or geography is located in an MSA; or the statewide non-metropolitan median family income, if a person or geography is located outside of an MSA.

"Affiliate" means any company that controls, is controlled by, or is under common control with another company. The term "control" has the meaning given to that term in 12 U.S.C. 1841(a)(2), and a company is under common control with another company if both companies are directly or indirectly controlled by the same company.

The Interagency Q&A and Interpretive Letters make it clear that qualified investments may be held directly or indirectly (i.e., via a mutual fund) and still receive favorable CRA consideration. Similarly, qualified loans may be originated or purchased, singularly or in a loan consortium. The Q&A and OCC Interpretive Letters specifically confirm that mortgage-backed securities (MBS) backed by loans made to low-to-moderate income borrowers are qualified CRA investments because they promote affordable housing for LMI individuals. As an approved CRA investment, Fannie Mae, Freddie Mac and several large banks make a market in taxable CRA-targeted MBS and collateralized mortgage obligations (CMOs), selling them to banks, funds, and other investors.

Bank owned life insurance (BOLI) is life insurance owned by banks (or grantor trusts) on the lives of executives and directors. BOLI is regulated by the OCC (and OTS, FRB, and FDIC) through a series of Banking Circulars (249) and Bulletins (96-51, 2000-23 and 2004-56) which provide guidance to ensure that bank purchases of life insurance are consistent with safe and sound banking practices. Banks typically purchase BOLI to cover the loss of key employees and to help manage human resource liabilities such as nonqualified pensions and post-retirement welfare benefits.

As life insurance, and under present tax law, BOLI enjoys tax-deferred cash value growth and tax-free death benefit proceeds. Further, the generally accepted accounting principles (GAAP) treatment for life insurance requires that the cash value be carried on the balance sheet and thus the growth in cash value is recognized in current earnings. The current cash surrender value (CSV) is reported in Other Assets and the periodic increase in CSV is reflected in book income.

The insurance industry offers several types of policies to address customer preferences regarding liquidity (Modified Endowment Contract (MEC) vs. Non-MEC), volatility (Guaranteed return vs. Mark-to-market), and credit risk (General Account vs. Separate Account). Larger institutions have historically preferred the improved credit risk and investment flexibility inherent in Separate Account policy designs. Most large BOLI purchases have been single premium MEC policies that will be held until the death of the insured employee; implying a 40+ year holding period. Presently, the ten largest U.S. banks which hold BOLI collectively have over $40 Billion of cash value recorded on their balance sheets. Most of it is in Separate Account BOLI.

Separate account life insurance permits the policy owner, within limits, to direct how the cash value is invested. The portfolio management of the account is provided either by the insurance company or a third-party investment advisor (sub-advisor). It is also common to have a Separate Account "plug-in" an insurance dedicated fund (IDF) that is offered and managed by independent asset managers. Portfolio managers can replicate existing mutual fund strategies but cannot comingle insurance and non-insurance dollars. Thus IDF "clones" of popular funds are often built and offered to insurance company Separate Accounts to attract new assets to manage.

Separate Accounts are legal/accounting entities that are owned by the sponsoring insurance company for use with variable life insurance and annuities. Assets in the Separate Account support liabilities associated with policy contracts and policyholders respective asset allocations. Properly structured, Separate Accounts assets are insulated from any liabilities arising from the General Account of the insurance company. Separate Accounts have been afforded "look-through" treatment by regulators; both for determining "bank-eligibility" and risk-based capital (RBC) treatment.

The OCC and other banking regulators define those permissible bank-eligible investments may be held by a bank within life insurance. Generally such investments are limited to government guaranteed or highly rated fixed-income securities. Thus, most Separate Account BOLI is invested in portfolios of U.S. Treasury and Agency securities; MBS guaranteed by Fannie Mae, Freddie Mac, and Ginnie Mae; and other high-grade fixed income securities.

In October 2004, the OCC publicly released Interpretive Letter #1008 which specifically addressed an inquiry from a division of a bank regarding the feasibility of obtaining CRA investment test credit within an appropriately designed (that is, one which exclusively holds CRA qualified investments) separate account BOLI policy. The OCC concluded that "an investment held in a BOLI-CRA separate account would be a qualified investment for the purpose of the bank's CRA performance, provided that the investment has a primary purpose of community development and benefits the bank's assessment area" on the primary basis that, per interagency guidance, CRA investments can be made directly or indirectly.

As explained more fully below, the present invention provides a mechanism whereby a bank can enjoy the tax benefits and other advantages of Separate Account BOLI (asset insulation, RBC look-through, etc.) while, at the same time, assisting the bank in meeting its requirements under the CRA.

SUMMARY OF THE INVENTION

The present invention is directed to systems and methods for assisting a bank in meeting all or a portion of the bank's requirements under the Community Reinvestment Act (CRA) on a tax-advantaged basis. New or existing cash value life insurance policies on the lives of employees of the bank or an affiliate of the bank are provided. The cash-value life insurance policies designate the bank, the affiliate or a trust (e.g., Grantor or Rabbi Trust) as owner and beneficiary. The assets which support the cash value of the life insurance policies are maintained in a separate account that is protected from general creditors of an issuer of the life insurance policies. The assets in the separate account are used to purchase, directly or indirectly, one or more (i) bank-eligible securities that are qualified investments, which promote community development, as defined under the CRA or (ii) whole loans that are qualified loans or which promote community development, as defined under the CRA.

As the value of the assets in the account grow, the bank owner(s) of the policies which participate in the separate account report the income on its/their balance sheet(s) and through its/their income statement(s). The value of the BOLI investment is recognized for book purposes (GAAP), but not for tax purposes because it is held in life insurance (i.e, it is tax-advantaged). Specific qualified loans, or investments, or portions of the underlying collateral thereof, in the separate account are attributed to each bank investor to satisfy the geographic requirement of the lending or investment test under the CRA.

In one embodiment, the separate account includes only assets supporting the cash value of the life insurance policies provided to the bank (single client or customer specific separate account). In an alternate embodiment, the separate account includes assets supporting the cash value of life insurance policies provided to a second bank. In one variation of this alternate embodiment, the separate account may only include assets from life insurance policies issued by a common issuer (comingled separate account). In a different variation of the alternate embodiment, a common insurance-dedicated fund accepts investments from the separate accounts of multiple insurance companies (registered or unregistered insurance dedicated fund). Any of these embodiments could be "sub-advised" or a "plug-in fund" structure.

Various loans and securities that are qualified investments under the CRA may be purchased using the assets in the separate account including: community development loans, loans to LMI borrowers, loans for affordable multifamily housing, "targeted" mortgage-backed securities (MBS) or collateralized mortgage obligations (CMO) issued or guaranteed by Fannie Mae, Freddie Mac, or Ginnie Mae that provide affordable housing. Such loans, MBS, and/or CMO may be backed by single family residential loans to low-to-moderate income (LMI) borrowers; alternatively, such loans, MBS, and/or CMO may be backed by multi-family residential loans made on projects which are eligible for the Low Income Housing Tax Credit (LIHTC). Other qualified investments could include: "Private label" MBS or CMO backed by loans to LMI borrowers or LIHTC projects; taxable state housing authority bonds; certificates of deposit (CD) issued by Community Development Financial Institutions (CDFIs) and guaranteed by the FDIC and certificates of deposit issued by Certificate of Deposit Account Registry services (CDARs); community development loan pools guaranteed by the US Government and its agencies.

DETAILED DESCRIPTION OF THE PREFERRED EMBODIMENT

Figure 1:
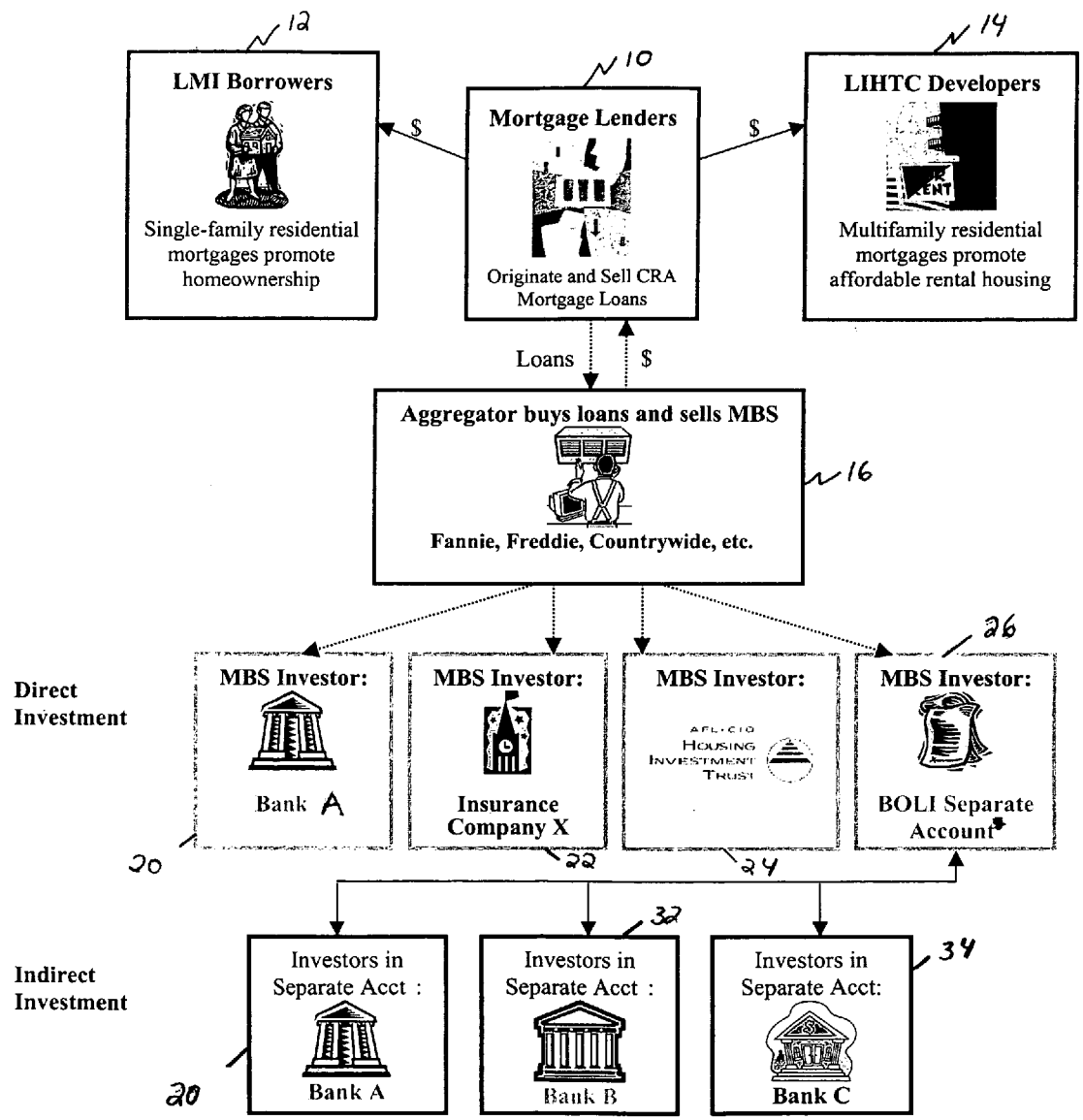
FIG. 1 is a flow diagram illustrating a method for assisting a bank in meeting its investment test requirement under the CRA via Separate Account BOLI.

Referring now to FIG. 1, there is shown a flow diagram illustrating a method for assisting a bank in meeting its investment test requirement under the CRA, in accordance with one embodiment of the present invention. More particularly, FIG. 1 illustrates how a CRA-BOLI separate account may be used to fund single- and multi-family residential mortgages for LMI borrowers and LIHTC developers.

Lenders 10 originate single- and multi-family residential mortgage loans that promote affordable housing and community development. Such loans may be mortgages to low- or moderate-income (LMI) borrowers 12, or loans to LIHTC developers 14 for the construction and permanent debt financing of LIHTC affordable apartment developments.

One or more aggregators 16 (alternatively, some lenders are Delegated Underwriters or Authorized Issuers who may securitize their own loans into MBS which contain a guarantee from Fannie Mae, Freddie Mac, or Ginnie Mae) pool and securitize the loans into securities (e.g., MBS) for sale to institutional investors. Examples of aggregators include Fannie Mae, Freddie Mac, and Countrywide. The securities generated by aggregators 16 constitute "qualified investments" under the CRA (i.e., investments that may be used to satisfy an institution's investment test requirement under the CRA), and have as their primary purpose community development. The securities can be sold directly to banks 20, insurance companies 22, or mutual finds 24. The securities can alternatively be sold to portfolio managers who purchase the MBS on behalf of investors in an insurance dedicated fund or insurance separate account 26, as discussed below.

Separate account 26 contains assets that support the cash value of one or more BOLI contracts owned by Bank 32 (or an affiliate or trust) on the lives of employees of Bank 32 (or the affiliate), wherein the BOLI contracts designate Bank 32 as beneficiary. Separate account 26 is protected from the general creditors of the issuer(s) of the BOLI contracts associated with the account. In the embodiment shown, separate account 26 also contains assets that support the cash value of one or more BOLI contracts owned by Bank 34 on the lives of employees of Bank 34, wherein the BOLI contracts designate Bank 34 as beneficiary; and separate account 26 contains assets that support the cash value of one or more BOLI contracts owned by Bank 20 (that is, the same Bank as above where purchase is direct) on the lives of employees of Bank 20, wherein the BOLI contracts designate Bank 20 as beneficiary. Although in the embodiment shown, separate account 26 contains the assets of BOLI contracts from different banks; it will be understood by those skilled in the art that a customer-specific separate account (i.e., a separate account that contains the assets of BOLI contracts from a single bank) could also be used.

Referring still to FIG. 1, the BOLI cash value contained within separate account 26 is used to purchase qualified investments under the CRA (created by aggregators 16), thereby allowing Banks 32, 34, 20 to make bank-eligible investments (i.e., securities which a bank may hold as defined by banking regulations 12 USC 24 and 12 CFR 1) which garner CRA consideration, while at the same time, allowing the banks to take advantage of the tax-advantaged treatment afforded to life insurance (i.e., investment return is not presently taxable because of the tax treatment afforded to life insurance under the Internal Revenue Code).

In one embodiment, a portfolio manager associated with separate account 26 uses the assets in the separate account to purchase MBS that constitutes a qualified investment under the CRA from aggregators 16. The MBS collateral purchased through separate account 26 is then attributed to the banks which participate in the separate account. Specifically, the portfolio investments are analyzed at the loan level detail and reported by the find manager to the various investors based on their assessment area(s). The loan level detail of each MBS pool comes from the aggregator or guarantor of the MBS and includes the property address, income level of the borrowers relative to the area median income, etc. so that the "LMI" designation can be verified. Each bank 32, 34, 20 reports the amount of qualified investments attributed to the bank during the examination period to the CRA examiner. The examiner determines whether or not the investments receive favorable consideration under the CRA.

In a particular embodiment, the investment guidelines of the separate account may permit the portfolio manager to purchase MBS at a price that buys down the rate to the primary market borrower. For example, the net after-tax yield of a standard MBS (6.0% assumed gross taxable yield=3.6% net after-tax, in a 40% tax bracket) can be matched at a lower rate in BOLI (5.0% gross=3.6% net of all insurance charges). The real value from a community development and affordable housing perspective is that the loan rate to the borrower in this example can be approximately 1% below market. Understandably, this result is conditioned on the BOLI investors accepting the lower tax-equivalent yield and finding a primary market lender to originate the below market loans, securitize them into MBS and sell the security to BOLI separate account 26.

Various securities that are qualified investments under the CRA may be purchased using the assets in separate account 26 including, for example, CRA-targeted mortgage-backed securities (MBS) or collateralized mortgage obligations (CMO) backed by loans made to low-to-moderate income borrowers, or CRA-targeted MBS or CMO backed by loans made for multi-family affordable housing. State housing authority bonds and Private-label CRA-targeted mortgage-backed securities or CMO may also be used.

Figure 2:
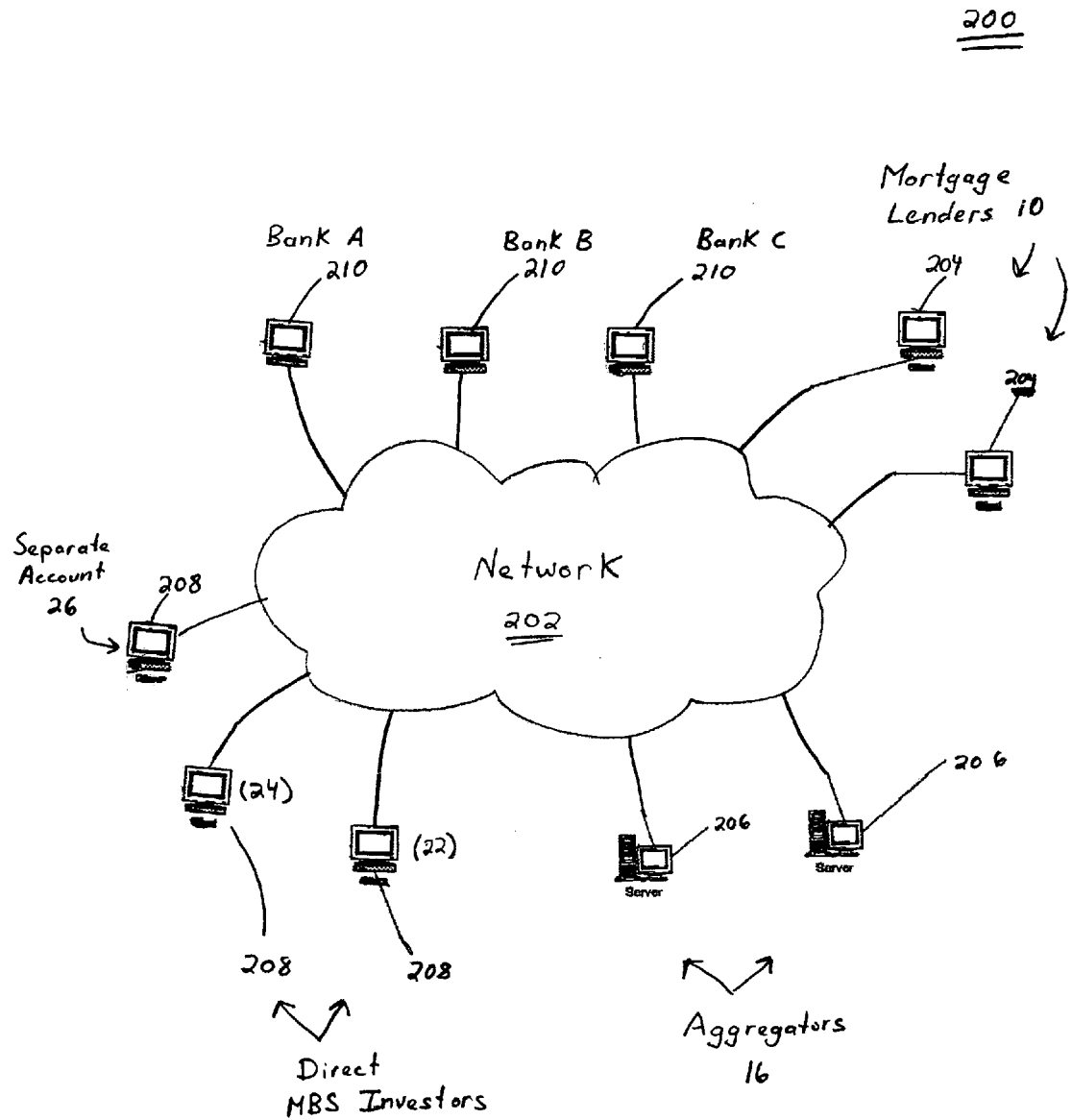
FIG. 2 shows a computer-implemented system for assisting one or more banks in meeting the investment test requirement under the CRA via Separate Account BOLI.

FIG. 2 shows a computer-implemented system 200 for assisting one or more banks in meeting the investment test requirement under the CRA. FIG. 2 may be used to implement the method shown in FIG. 1. System 200 contains a network 202 (e.g., the Internet, LAN, WAN or Intranet), which is used to provide communication links between various devices and computers connected together within system 200. In the depicted example, personal or network computers 204, 208, 210 and servers 206 are connected to network 202.

Computers 204 correspond to workstations with application software, and are used by mortgage lenders 10 for communicating electronically with aggregators 16 in order to facilitate the loan aggregation process. Servers 206 are maintained by aggregators 16 and include software for communicating with mortgage lender workstations 204. In addition, servers 206 have application software that is used to make an electronic market for the CRA-targeted MBS marketed by aggregators 16. Direct investors 20, 22, 24 and the manager of separate account 26 participate in the electronic market via workstations 208, which include application software for purchasing CRA-targeted MBS from aggregators 16 in the electronic market. Banks A, B, C use workstations 210 (and/or intermediaries) to communicate investment preferences (asset allocation) to separate account workstation 208, and separate account workstation 208 communicates to workstations 210 information about how the CRA-targeted MBS purchased by the manager of separate account 26 will be attributed to the banks.

Figure 3:
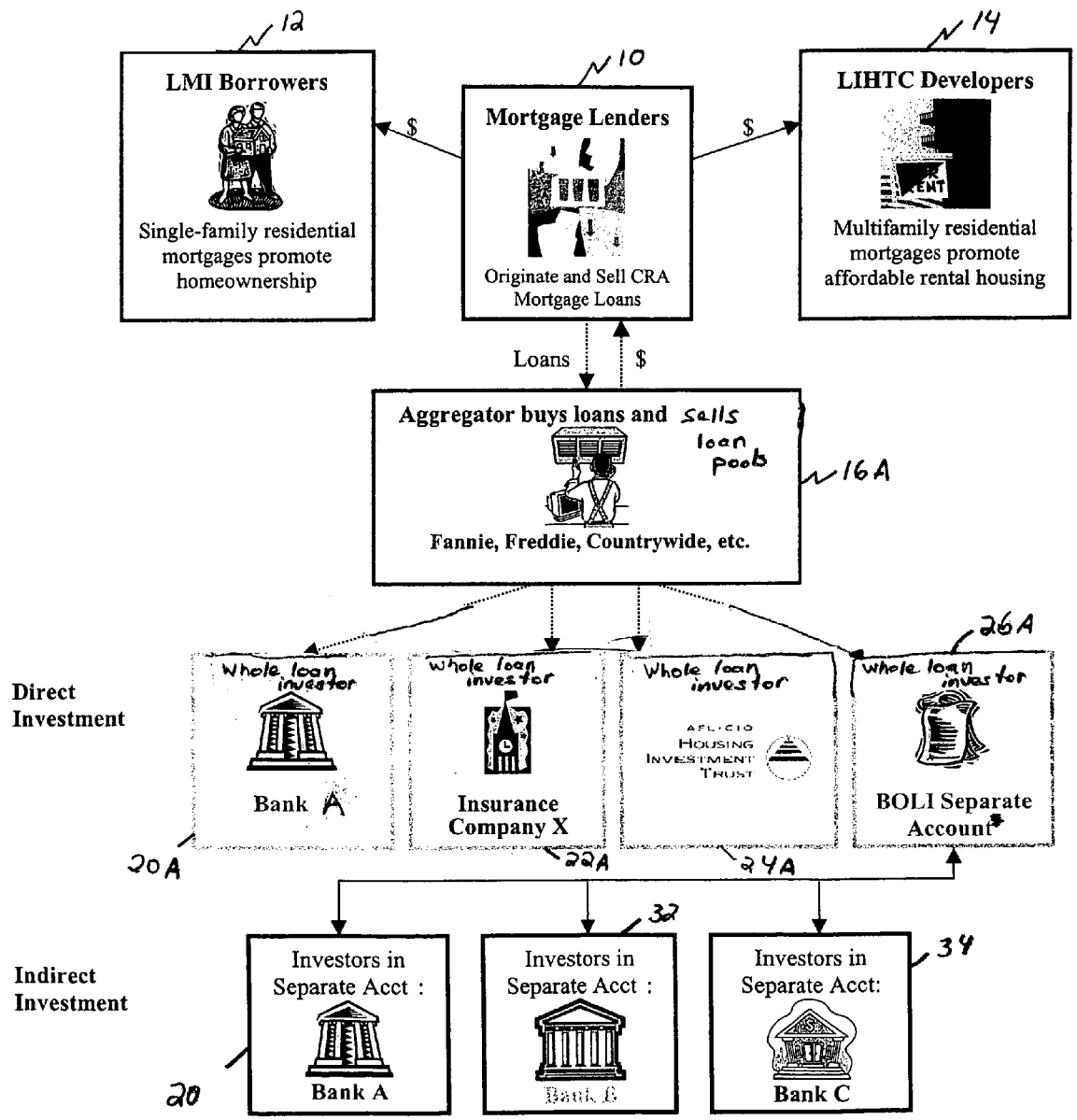
FIG. 3 is a flow diagram illustrating a method for assisting a bank in meeting its lending test requirement under the CRA via Separate Account BOLI.

Referring now to FIG. 3, there is shown a flow diagram illustrating a method for assisting a bank in meeting its lending test requirement under the CRA, in accordance with a further embodiment of the present invention. More particularly, FIG. 3 illustrates how a CRA-BOLI separate account may be used to fund single- and multi-family residential mortgages for LMI borrowers and LIHTC developers. Lenders 10 originate single- and multi-family residential mortgage loans that promote affordable housing and community development. Such loans may be mortgages to low- or moderate-income (LMI) borrowers 12, or loans to developers 14 for the construction and permanent debt financing of affordable apartment developments. One or more aggregators 16A pool whole or partial loans for sale to institutional investors. Examples of originators and aggregators include GMAC Commercial Mortgage, MMA Financial, and Fannie Mae, and the loans or loan pools generated by aggregators 16A constitute assets that can be considered under either the lending or investment test under the CRA. The loans or loan pools can be sold directly to banks 20A, insurance companies 22A, or mutual funds 24A. The loans or loan pools can alternatively be sold to portfolio managers who purchase them on behalf of investors in an insurance dedicated fund or insurance separate account 26A.

Referring still to FIG. 3, the BOLI cash value contained within separate account 26A is used to purchase qualified loans under the CRA (created by aggregators 16A), thereby allowing Banks 32, 34, 20 to purchase bank-eligible loans (i.e., loans which a bank may hold as defined by banking regulations 12 USC 24 and 12 CFR 1) which garner CRA consideration, while at the same time, allowing the banks to take advantage of the tax-advantaged treatment afforded to life insurance (i.e., investment return is not presently taxable because of the tax treatment afforded to life insurance under the Internal Revenue Code). In one embodiment, a portfolio manager associated with separate account 26A uses the assets in the separate account to purchase one or more loans that constitutes a qualified loan under the CRA from aggregators 16A. The loans purchased through separate account 26A are then attributed to the banks which participate in the separate account. Specifically, the portfolio investments are analyzed at the loan level detail and reported by the fund manager to the various investors based on their assessment area(s). The loan level detail of each pool comes from the aggregator or loan servicer and includes the property address, income level of the borrowers relative to the area median income, etc. so that the "LMI" or affordable housing designation can be verified. Each bank 32, 34, 20 reports the amount of qualified loans attributed to the bank during the examination period to the CRA examiner. The examiner determines whether or not the loans receive favorable consideration under the CRA.

In another embodiment, the assets in the separate account or comingled IDF purchase a Structured Note which is based on underlying CRA whole loans. [A similar configuration for hedge finds was commented upon by the OCC in Interpretive Letter 1030 (June 2005)]. The structured note mechanism would permit a favorable single credit rating (i.e., S&P or Moody's) to be assigned to the CRA loan pool, which is comprised of multiple individual borrowers with low or no credit rating.

In the embodiment shown in FIG. 3, various community development loans may be purchased using the assets in separate account 26A including, for example, community development loan pools guaranteed by the US Government and its agencies, or, for example, construction or permanent loans on LIHTC multi-family rental housing. In addition, assets from the separate account 26A may be used to purchase loans made to small businesses or small farms that are qualified loans under the CRA.

Figure 4:
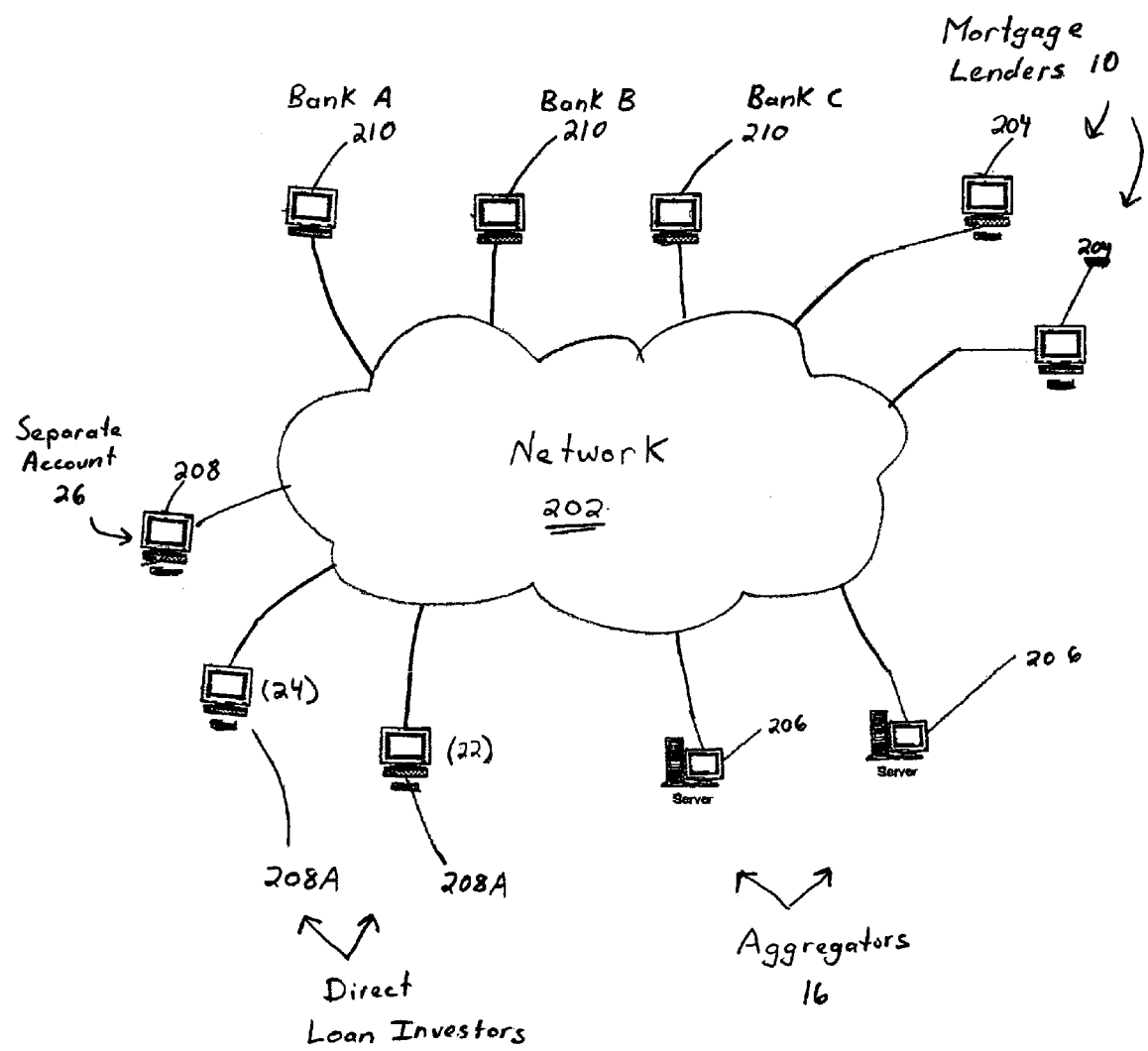
FIG. 4 shows a computer-implemented system for assisting one or more banks in meeting the lending test requirement under the CRA via Separate Account BOLI.

FIG. 4 shows a computer-implemented system 200A for assisting one or more banks in meeting the lending test requirement under the CRA. FIG. 2 may be used to implement the method shown in FIG. 1. System 200 contains a network 202 (e.g., the Internet, LAN, WAN or Intranet), which is used to provide communication links between various devices and computers connected together within system 200. In the depicted example, personal or network computers 204, 208, 210 and servers 206 are connected to network 202.

Computers 204 correspond to workstations with application software, and are used by mortgage lenders 10 for communicating electronically with aggregators 16 in order to facilitate the loan pooling process. Servers 206 are maintained by aggregators 16 and include software for communicating with mortgage lender workstations 204. In addition, servers 206 have application software that is used to make an electronic market for loan pools marketed by aggregators 16. Direct investors 20, 22, 24 and the manager of separate account 26 participate in the electronic market via workstations 208A, which include application software for purchasing CRA-targeted loan pools from aggregators 16A in the electronic market. Banks A, B, C use workstations 210 (and/or intermediaries) to communicate investment preferences (asset allocation) to separate account workstation 208A, and separate account workstation 208A communicates to workstations 210 information about how the CRA-targeted loan pools purchased by the manager of separate account 26A will be attributed to the banks.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method for assisting a bank in meeting all or a portion of the bank's investment test requirement under the Community Reinvestment Act (CRA) on a tax-advantaged basis through use of cash value life insurance policies on the lives of employees of the bank or an affiliate of the bank, wherein the cash-value life insurance policies designate the bank, the affiliate or a trust as owner and beneficiary, and wherein assets which support the cash value of the life insurance policies are maintained in a separate account that is protected from general creditors of an issuer of the life insurance policies, comprising:

using the assets from the separate account to purchase one or more bank-eligible securities that are qualified investments, each of said qualified investments constituting an investment, deposit, membership share or grant that would have been lawful under the CRA as it existed on August 15, 2005, and having as its primary purpose community development, wherein the assets in the separate account grow on a tax-advantaged basis; and attributing specific qualified investments in the separate account to the bank to satisfy the investment test requirement of the bank under the CRA.

2. The method of claim 1, wherein the securities that are qualified investments under the CRA comprise at least one of: mortgage-backed securities backed by loans made to low-to-moderate income borrowers, collateralized mortgage obligations backed by loans made to low-to-moderate income borrowers, or loans made to low-to-moderate income borrowers.

3. The method of claim 1, wherein the securities that are qualified investments under the CRA comprise at least one of: mortgage-backed securities backed by loans made for affordable multi-family rental housing that is eligible for the low income housing tax credit, loans made for affordable multi-family rental housing that is eligible for the low income housing tax credit, or collateralized mortgage obligations backed by loans made for affordable multi-family rental housing.

4. The method of claim 1, wherein the securities that are qualified investments under the CRA comprise state or local housing authority bonds, certificates of deposit of CDFI's, and CDARs.

5. A system for assisting a bank in meeting all or a portion of the bank's investment test requirement under the Community Reinvestment Act (CRA) on a tax-advantaged basis through use of cash value life insurance policies on the lives of employees of the bank or an affiliate of the bank, wherein the cash-value life insurance policies designate the bank, the affiliate or a trust as owner and beneficiary, and wherein assets which support the cash value of the life insurance policies are maintained in a separate account that is protected from general creditors of an issuer of the life insurance policies, comprising:

a computer with software that electronically purchases, with assets from the separate account, one or more bank-eligible securities that are qualified investments, each of said qualified investments constituting an investment, deposit, membership share or grant that would have been lawful under the CRA as it existed on August 15, 2005, and having as its primary purpose community development, wherein the assets in the separate account grow on a tax-advantaged basis;

wherein the software attributes specific qualified investments purchased on behalf of the separate account to the bank to satisfy the investment test requirement of the bank under the CRA.

6. A method for assisting a bank in meeting all or a portion of the bank's lending test requirement under the Community Reinvestment Act (CRA) on a tax-advantaged basis through use of cash value life insurance policies on the lives of employees of the bank or an affiliate of the bank, wherein the cash-value life insurance policies designate the bank, the affiliate or a trust as owner and beneficiary, and wherein assets which support the cash value of the life insurance policies are maintained in a separate account that is protected from general creditors of an issuer of the life insurance policies, comprising:

using the assets from the separate account to purchase one or more loans that are qualified loans, each of said qualified loans being a loan that counts towards satisfaction of the lending test requirement of the bank under the CRA, wherein the assets in the separate account grow on a tax-advantaged basis; and attributing one or more specific qualified loans in the separate account to the bank to satisfy the lending test requirement of the bank under the CRA.

7. The method of claim 6, wherein the loans that are qualified loans under the CRA comprise loans made to low-to-moderate income borrowers or loans made for affordable multi-family rental housing that is eligible for the low income housing tax credit.

8. The method of claim 6 wherein the loans that are qualified loans under the CRA comprise loans made to small businesses or small farms.

9. A system for assisting a bank in meeting all or a portion of the bank's lending test requirement under the Community Reinvestment Act (CRA) on a tax-advantaged basis through use of cash value life insurance policies on the lives of employees of the bank or an affiliate of the bank, wherein the cash-value life insurance policies designate the bank, the affiliate or a trust as owner and beneficiary, and wherein assets which support the cash value of the life insurance policies are maintained in a separate account that is protected from general creditors of an issuer of the life insurance policies, comprising:

a computer with software that electronically purchases with assets from the separate account, one or more loans that are qualified loans, each of said qualified loans being a loan that counts towards satisfaction of the lending test requirement of the bank under the CRA, wherein the assets in the separate account grow on a tax-advantaged basis;

wherein the software attributes specific qualified loans purchased on behalf of the separate account to the bank to satisfy the lending test requirement of the bank under the CRA.

\* \* \* \* \*